(12) United States Patent
Kimiyama et al.

(10) Patent No.: US 8,144,773 B2
(45) Date of Patent: Mar. 27, 2012

(54) CODING APPARATUS, CODING METHOD, AND CODING SYSTEM

(75) Inventors: Kenji Kimiyama, Sagamihara (JP); Tomoaki Sugiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 905 days.

(21) Appl. No.: 12/185,397

(22) Filed: Aug. 4, 2008

(65) Prior Publication Data

US 2009/0129469 A1 May 21, 2009

(30) Foreign Application Priority Data

Nov. 20, 2007 (JP) .................. 2007-300784

(51) Int. Cl.
*H04N 7/12* (2006.01)
(52) U.S. Cl. .................. 375/240.15
(58) Field of Classification Search ........... 375/240.01, 375/240.15; *H04N 7/12*
See application file for complete search history.

(56) References Cited

U.S. PATENT DOCUMENTS

| 5,436,665 | A | * | 7/1995 | Ueno et al. | ............ | 375/240.14 |
| 6,798,837 | B1 | * | 9/2004 | Uenoyama et al. | ...... | 375/240.16 |
| 2007/0025439 | A1 | | 2/2007 | Han et al. | | |
| 2007/0133951 | A1 | | 6/2007 | Flecchia | | |

FOREIGN PATENT DOCUMENTS

| JP | 8-265694 | 10/1996 |
| JP | 2000-312362 | 11/2000 |
| JP | 2004-187161 | 2/2004 |
| WO | WO 2006/080779 | 8/2006 |

OTHER PUBLICATIONS

Communication and European Search Report from the European Patent Office dated Mar. 6, 2009, for Application No. 08161808.4, 6 pages.
Notice of Reasons for Rejection issued by the Japanese Patent Office in Japanese Patent Application No. 2007-300784, mailed Apr. 26, 2011, (2 pages total).

* cited by examiner

*Primary Examiner* — Young Lee
*Assistant Examiner* — Tracy Li
(74) *Attorney, Agent, or Firm* — Finnegan, Henderson, Farabow, Garrett & Dunner, L.L.P.

(57) ABSTRACT

A first prediction unit performs intra-prediction of an original image corresponding to an inter-frame coded frame to produce a first prediction residual and a prediction parameter. A second prediction unit performs intra-prediction of local decode data corresponding to the inter-frame coded data with the prediction parameter to produce a second prediction residual. A subtractor calculates difference data between the first prediction residual and the second prediction residual. A third prediction unit performs intra-prediction of data corresponding to a decoded frame with the prediction parameter to produce a third prediction residual, when the inter-frame coded data is decoded and transformed into the intra-frame coded data. An adder calculates addition data of the third prediction residual and the differential data. An intra-frame coding unit performs intra-frame coding to the addition data.

6 Claims, 4 Drawing Sheets

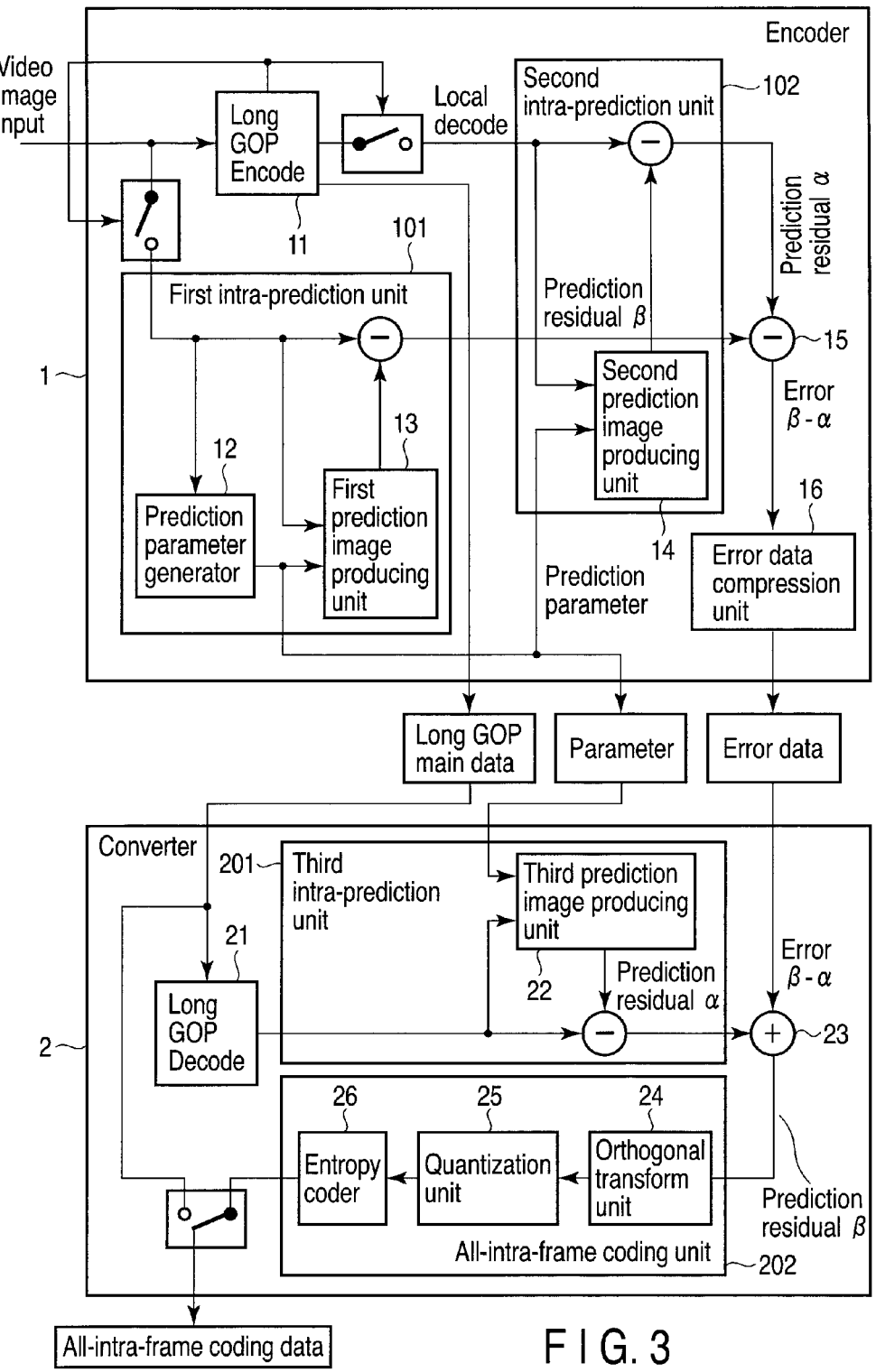
F I G. 3

US 8,144,773 B2

CODING APPARATUS, CODING METHOD, AND CODING SYSTEM

CROSS-REFERENCE TO RELATED APPLICATIONS

This application is based upon and claims the benefit of priority from prior Japanese Patent Application No. 2007-300784, filed Nov. 20, 2007, the entire contents of which are incorporated herein by reference.

BACKGROUND OF THE INVENTION

1. Field of the Invention

The present invention relates to a coding apparatus which performs coding by switching between intra-frame coding and inter-frame coding, a coding method, and a coding system.

2. Description of the Related Art

Intra-frame coding in which intra-frame prediction is utilized and inter-frame coding in which inter-frame prediction is utilized are used as a technique of performing compression coding of moving image data. In the intra-frame coding, a difference between pixels adjacent to each other in a frame is obtained to perform coding, thereby compressing the moving image data. In the inter-frame coding, a high correlation between continuous frames is used to obtain a difference between preceding and subsequent frames of a coding object frame, and coding is performed to compress the moving image data. A high compression rate and image quality can be realized by switching between the two coding techniques according to the frame.

However, because the frame cannot be reproduced alone in the inter-frame coding, video images are hardly trimmed or combined in frame unit during editing. There is also generated a problem in special reproduction such as fast-forward and reverse reproduction in searching for an editing point. The image quality is deteriorated, when the inter-frame coding data is further transformed into an All-Intra-frame coding moving image in order to perform the editing in frame unit. When the editing is abandoned in frame unit to perform the editing in GOP (Group of Picture) unit, inter-frame coding data is hardly dealt with because a degree of freedom is lowered. When only the All-Intra-frame coding is used from the time of recording, a recording time in medium is shortened because of the low compression rate.

For example, Jpn. Pat. Appln. KOKAI Publication Nos. 2000-312362 and 8-265694 discloses associated techniques.

BRIEF SUMMARY OF THE INVENTION

In accordance with an aspect of the invention, there is provided a coding apparatus which codes moving images having a plurality of frames by switching between intra-frame coding and inter-frame coding. The apparatus performs intra-prediction of an original image corresponding to the inter-frame coded frame to produce a first prediction residual and a prediction parameter; performs intra-prediction of decode data of the inter-frame coded frame with the prediction parameter to produce a second prediction residual; calculates difference data between the first prediction residual and the second prediction residual; performs intra-prediction of data corresponding to a decoded frame with the prediction parameter to produce a third prediction residual when the inter-frame coded data is decoded and transformed into the intra-frame coded data; calculates addition data of the third prediction residual and the differential data; and performs intra-frame coding of the addition data.

According to another aspect of the invention, there is provided a coding method of coding moving images having a plurality of frames by switching between intra-frame coding and inter-frame coding, the method comprising: performing intra-prediction of an original image corresponding to the inter-frame coded frame to produce a first prediction residual and a prediction parameter; performing intra-prediction of decode data of the inter-frame coded frame with the prediction parameter to produce a second prediction residual; computing difference data between the first prediction residual and the second prediction residual; performing intra-prediction of data corresponding to the decoded frame with the prediction parameter to produce a third prediction residual when the inter-frame coded data is decoded and transformed into the intra-frame coded data; computing addition data of the third prediction residual and the differential data; and performing intra-frame coding of the addition data.

According to another aspect of the invention, there is provided a coding system comprising: a coding apparatus which codes moving images having a plurality of frames to produce first coding data by switching between intra-frame coding and inter-frame coding; and a transform apparatus which performs intra-frame coding to all the frames of the first coding data to transform the first coding data into second coding data, wherein the coding apparatus includes: a first prediction unit which performs intra-prediction of an original image corresponding to the inter-frame coded frame in the first coding data to obtain a first prediction residual and a prediction parameter; a second prediction unit which performs intra-prediction of a decode image of the inter-frame coded frame in the produced first coding data with the prediction parameter to produce a second prediction residual; a subtractor which calculates a difference between the first prediction residual and the second prediction residual in each frame as error data; and an output unit which outputs the first coding data, prediction parameter and error data, and the transform apparatus includes: an input unit into which the first coding data, prediction parameter and error data output from the coding apparatus are input; a decoding unit which decodes the inter-frame coded frame in the first coding data; a third prediction unit which performs intra-prediction to the decoded frame with the prediction parameter to produce a third prediction residual; an adder which calculates addition data by adding the third prediction residual to the error data in each frame; and a coding unit which performs intra-frame coding of the addition data into second coding data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram showing a configuration of a coding system according to an embodiment of the invention;

DETAILED DESCRIPTION OF THE INVENTION

An embodiment of the invention will be described in detail below with reference to the drawings.

Figure 1:
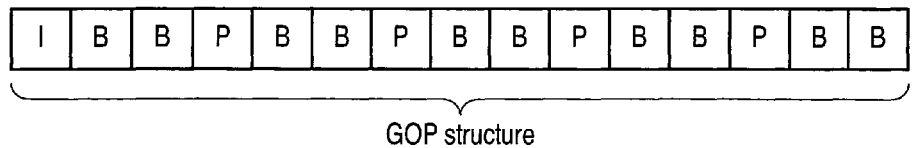
FIG. 1 shows a frame configuration of Long-GOP data.
Figure 2:
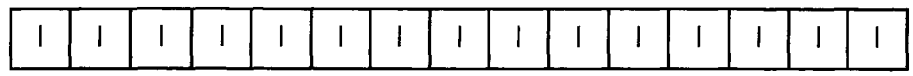
FIG. 2 shows a frame configuration of All-Intra-frame data.

A configuration of coding data dealt with in a coding system according to an embodiment of the invention will be described. FIG. 1 shows a frame configuration of general Long-GOP data. FIG. 2 shows a frame configuration of All-Intra-frame data.

As shown in FIG. 1, frames constituting GOP include three kinds of frames, that is, an I Flame (Intra-coded Flame), a P Flame (Predictive-coded Flame), and a B Flame (Bidirectional-coded Flame). At least one I Flame is included in each GOP in order to impart independence. The I Flame is similar to one frame of the All-Intra-frame configuration of FIG. 2, and the I Flame can be reproduced alone. On the other hand, the P Flame is the one to which the inter-frame coding is performed. In general coding of the P Flame, using another image as a reference frame, pattern matching is performed to detect motion while the P Flame is divided into blocks, and prediction image data is produced to obtain a difference with an input image. The B Flame is also the one to which the inter-frame coding is performed. In the B Flame, two images are used as the reference frame.

In decoding Long-GOP, because the frame which has been used as the reference frame is required, the frame cannot simply be trimmed or combined in locations except for the I Flame. In the case where the reproduction is displayed every second frame such as double-speed reproduction, it is necessary to decode the reference frame in addition to the display frame. In the case of the reverse reproduction, it is necessary that the reproduction be reproduced from a final frame of GOP after one GOP is decoded from the I Flame which becomes separation of GOP. Because an operation response becomes significant during the editing, Long-GOP is not suitable to the editing time, so Long-GOP is often transformed such that the reproduction can be performed in frame unit from anywhere like the All-Intra-frame configuration of FIG. 2. In the case of an H.264/AVC standard whose application is recently being increased, there is no regularity in selecting the reference frame, and an algorithm which can be edited by utilizing the regularity is hardly developed unlike MPEG2.

Therefore, in the coding system of the embodiment, the Long-GOP data can be transformed into the All-Intra-frame data without deteriorating the image quality even in the H.264/AVC standard in which the regularity does not exist in selecting the reference frame.

FIG. 3 is a block diagram showing a configuration of a coding system according to the embodiment of the invention. The coding system includes an encoder 1 and a converter 2. The encoder 1 codes an input video image into Long-GOP data during the recording, and records the Long-GOP data in a recording medium. When the Long-GOP data is taken in an editing device, the converter 2 transforms the Long-GOP data recorded in the recording medium into an All-Intra-frame format in which a correlation between frames is not used.

The encoder 1 includes a Long-GOP coding unit 11, a first intra-prediction unit 101, a second intra-prediction unit 102, a subtractor 15, and an error data compression unit 16. The first intra-prediction unit 101 includes a prediction parameter generator 12, and a first prediction image producing unit 13. The second intra-prediction unit 102 includes a second prediction image producing unit 14. The Long-GOP coding unit 11 codes the input image to store the coded image in the recording medium. Examples of the recording medium include a flash memory cartridge, a hard disk, and a writable optical disk.

In the coding performed by the Long-GOP coding unit 11, the input image is supplied to the first intra-prediction unit 101 while the frame is not the I Flame. The prediction parameter generator 12 determines a prediction parameter of the input image, and the first prediction image producing unit 13 performs the intra-frame coding to the input image. A Long-GOP local decode result, which is produced in the coding performed by the Long-GOP coding unit 11 when the frame is not the I Flame, is supplied to the second intra-prediction unit 102, and the second prediction image producing unit 14 performs the intra-frame coding the Long-GOP local decode result.

At this point, it is necessary that the coding be performed with the same coding parameter in the first prediction image producing unit 13 and the second prediction image producing unit 14. For example, in the case where the coding method is pursuant to the H.264/AVC standard, the coding parameter includes a macro block type, an intra-prediction direction, a transform method, and pattern information on a coded block. The data supplied from the first prediction image producing unit 13 and second prediction image producing unit 14 depends on the coding parameters. In the intra-frame coding processing, prediction data is produced from neighboring pixels in each block having a variable size such as 4-by-4, 8-by-8, and 16-by-16, the prediction data is compared to the input pixel to obtain a difference, and orthogonal transform, quantization, and entropy coding are performed to the difference. In the embodiment, the subtractor 15 calculates the difference between outputs from the two prediction image producing units as error data, and supplies the error data along with the prediction parameter at that time. The output comparison in the encoder 1 is performed before the orthogonal transform and quantization performed in the usual intra-frame coding processing and the entropy coding of CABAC (Context Adaptive Binary Arithmetic Coding) or CAVLC (Context Adaptive Variable Length Coding). This enables a processing load to be reduced.

Because a data amount is increased in the case of error data having a large size, the error data compression unit 16 performs adjustment to reduce a coding amount by techniques such as the orthogonal transform, the quantization, and the entropy coding. Because the image quality is slightly lowered by the adjustment, it is necessary that a quantization step for determining the compression rate be set within a range which is allowable by an application. A usual image compression method can be applied because the error data is a kind of the image. The compressed error data is recorded in the recording medium along with Long-GOP main data.

On the other hand, the converter 2 includes a Long-GOP decoding unit 21, a third prediction image producing unit 201, an adder 23, and an all-intra-frame coding unit 202. The third prediction image producing unit 201 includes a third prediction image producing unit 22. The all-intra-frame coding unit 202 includes an orthogonal transform unit 24, a quantization unit 25, and an entropy coder 26.

The converter 2 takes in the Long-GOP main data, the prediction parameter, and the error data through the recording medium. The converter 2 reads the Long-GOP main data. The converter 2 flips a switch to directly supply the I Flame when the Long-GOP main data is the I Flame, and the Long-GOP decoding unit 21 decodes the Long-GOP main data when the Long-GOP main data is a frame except for the I Flame. The decoded data is supplied to the third prediction image producing unit 201. The third prediction image producing unit 22 produces an intra-prediction image from decode result of the Long-GOP decoding unit 21 according to the prediction parameter.

Before the orthogonal transform, the quantization, and the entropy coding are performed, the adder 23 adds the error data to a prediction residual in which a difference between the intra-prediction image produced by the third prediction image producing unit 22 and the decode result of the Long-GOP decoding unit 21 is calculated. The post-addition data is equal to the prediction residual to which the encoder directly performs the All-Intra-frame coding when the error data coding amount is adjusted by a lossless (reversible) method. The all-intra-frame coding unit 202 transforms the result into the All-Intra-frame data for editing by performing the orthogonal transform, the quantization, and the entropy coding through the orthogonal transform unit 24, the quantization unit 25, and the entropy coder 26.

An operation of the coding system of the embodiment will be described below.

(Encoder)

Figure 4:
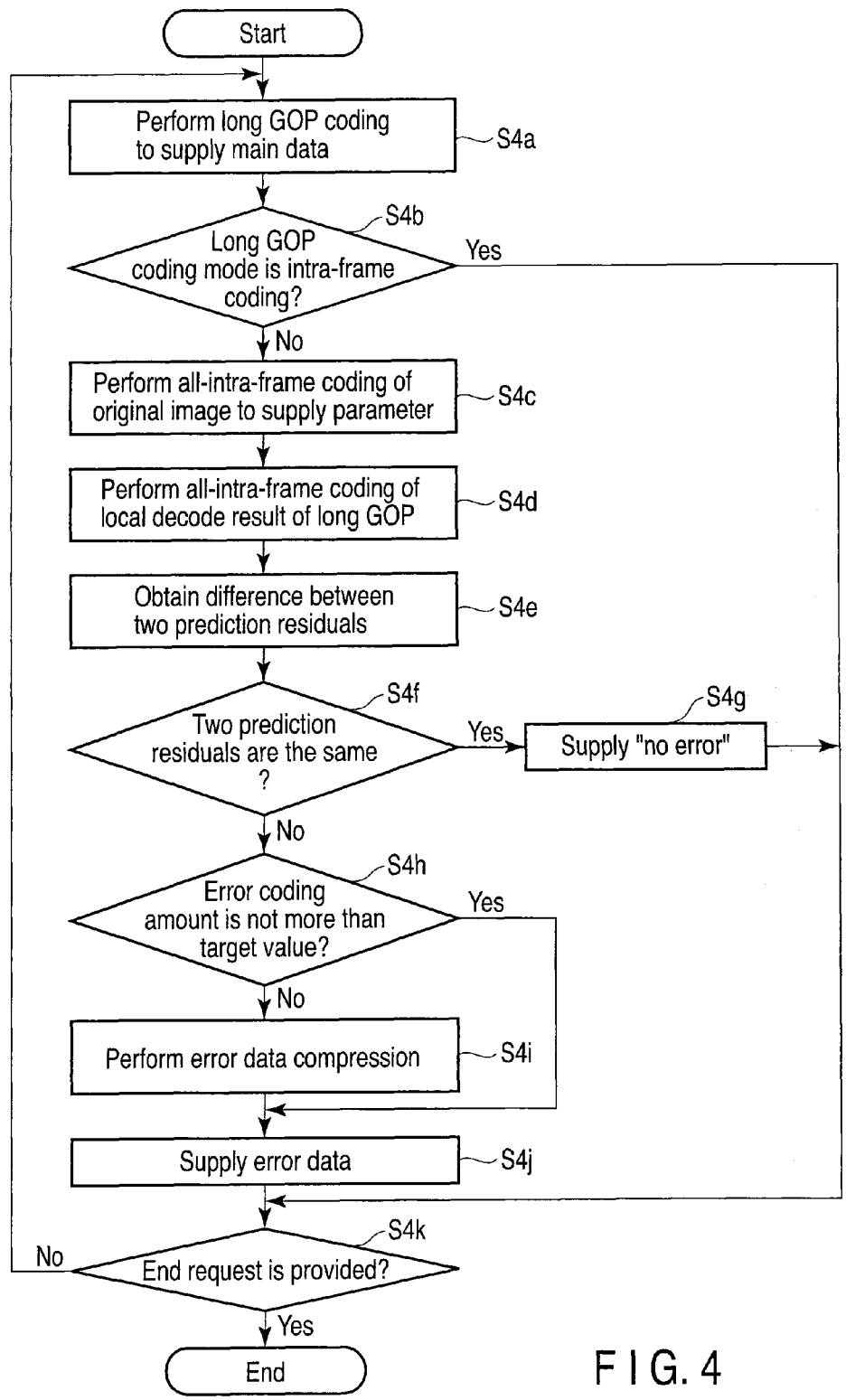
FIG. 4 is a flowchart showing an encoder processing procedure.

FIG. 4 is a flowchart showing an encoder processing procedure. The Long-GOP coding unit 11 codes the input image into the Long-GOP data and supplies the Long-GOP data (Step S4*a*). Each frame of the Long-GOP data is determined whether or not the frame is the intra-frame coding (Step S4*b*). When the frame is the intra-frame coding, the coding data is directly supplied.

When the frame is the inter-frame coding in Step S4*b*, an original image corresponding to the frame is supplied to the first intra-prediction unit 101. The prediction parameter generator 12 determines the prediction parameters such as the intra-prediction direction and the block. The first prediction image producing unit 13 performs the All-Intra-frame coding to the original image using the determined prediction parameter (Step S4*c*). The first intra-prediction unit 101 produces a prediction residual β which is the difference between the input image and the intra-prediction image of the first prediction image producing unit 13. As shown in FIG. 3, the All-Intra-frame coding is only part of the usual All-Intra-frame coding. The orthogonal transform, the quantization, and the entropy coding are omitted. The prediction parameter determined by the prediction parameter generator 12 is stored in the recording medium.

When the frame is the inter-frame coding in Step S4*b*, the local decode output (identical to the Long-GOP decode result, the decode result is diverted because the encoder has a mechanism in which the decoding is always performed) of the Long-GOP coding unit 11 is supplied to the second intra-prediction unit 102. The second prediction image producing unit 14 performs the All-Intra-frame coding the Long-GOP decode result using the prediction parameter determined by the prediction parameter generator 12 (Step S4*d*). The second intra-prediction unit 102 generates a prediction residual α which is a difference between the Long-GOP decode result and the intra-prediction image of the second prediction image producing unit 14.

The prediction residual β supplied from the first intra-prediction unit 101 and the prediction residual α supplied from the second intra-prediction unit 102 are supplied to the subtractor 15. The subtractor 15 calculates a difference β−α between the two prediction residuals α and β (Step S4*e*). When the prediction residuals α and β are the same, "no error" is supplied (Step S4*g*). When the prediction residuals α and β are not the same, the difference β−α is set at the error data.

The error data compression unit 16 compares the error data coding amount to a target value (Step S4*h*). When the error data coding amount exceeds the target value, processing for adjusting the coding amount is performed by the compression processing or the like (Step S4*i*). For example, an error allowable range of the differential data is adjusted such that the total of the error data amount and the Long-GOP data amount does not exceed the data amount in the case where the intra-frame coding is performed to the original moving image. The error data is supplied (Step S4*j*), and the above-described processing is repeated every one frame until an end request is provided (Step S4*k*).

(Converter)

Figure 5:
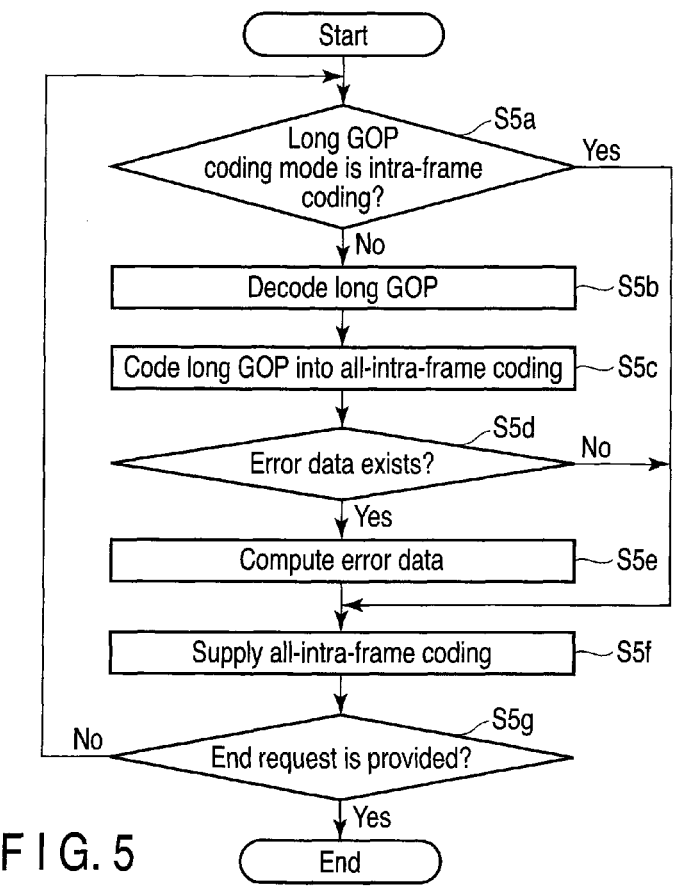
FIG. 5 is a flowchart showing a converter processing procedure.

FIG. 5 is a flowchart showing a processing procedure of the converter 2. The converter 2 takes in the Long-GOP main data, the prediction parameter, and the error data through the recording medium. The coding mode of the taken-in Long-GOP is checked in each frame (Step S5*a*). When the frame is not the I Flame, the Long-GOP decoding unit 21 performs the decoding (Step S5*b*). When the frame is the I Flame, the frame is directly supplied (Step S5*f*).

The decoded frame is supplied to the third intra-prediction unit 201, and the third prediction image producing unit 22 codes the decoded frame into the intra-prediction image using the taken-in prediction parameter (Step S5*c*). When the error data exists in Step S5*d*, the adder 23 adds the error data β−α to the prediction residual α between the intra-prediction image and the Long-GOP decode result (Step S5*e*). The case in which the error data does not exist in Step S5*d* indicates no difference between the case in which the All-Intra-frame coding is performed to the original image and the case in which the All-Intra-frame coding is performed again after the Long-GOP data is coded. The all-intra-frame coding unit 202 performs the All-Intra-frame coding to the obtained prediction residual β by the orthogonal transform, the quantization, and the entropy coding and supplies the All-Intra-frame coding data to end the processing for one Flame (Step S5*f*). The processing is repeated in each frame until the end request is provided (Step S5*g*).

The effect of the moving image coding transform system of the embodiment will be described below.

Figure 6:
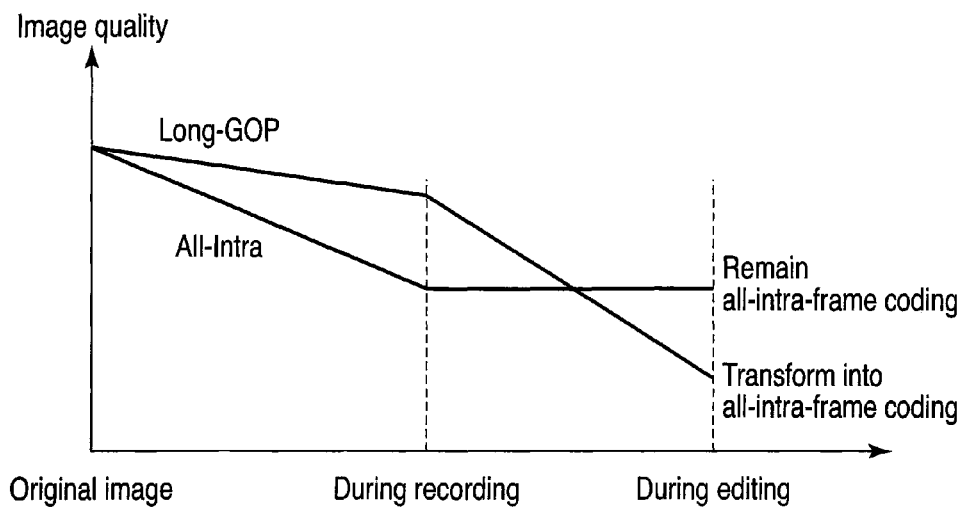
FIG. 6 shows a change in image quality in a transform performed by a conventional coding method.

FIG. 6 shows a change in image quality in a transform performed by a conventional coding method. In FIG. 6, a horizontal axis indicates image quality of an original image, image quality during the recording, and image quality during the editing from the left side, and a vertical axis indicates that the image quality becomes better toward the upward direction. FIG. 6 shows two graphs, that is, the case in which Long-GOP is used during the recording while the data is transformed into the All-Intra-frame coding during the editing and the case in which the All-Intra-frame coding is used from the recoding to the editing. In the case of Long-GOP, although the image quality is better than that of the All-Intra-frame coding during the recording, the image quality is deteriorated by the transform during the editing. Such transforms are frequently performed in currently commercially available editing software.

Figure 7:
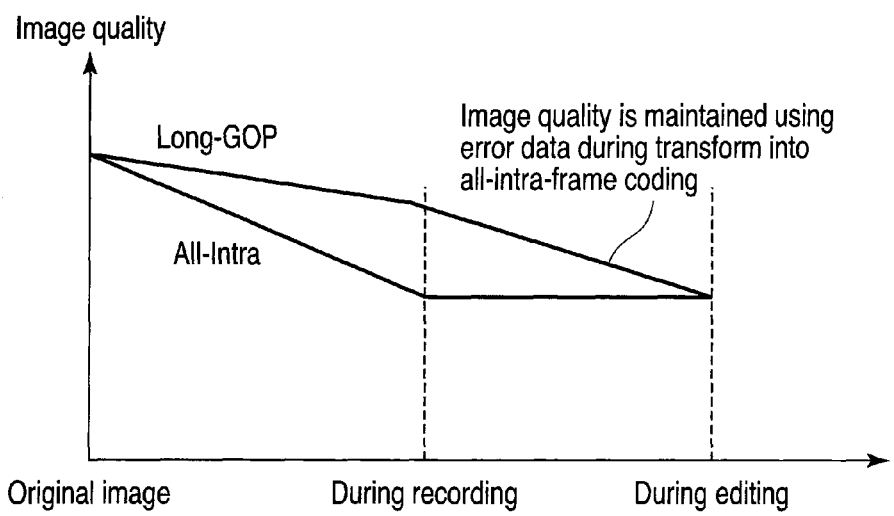
FIG. 7 shows a change in image quality in the coding system of the embodiment.

FIG. 7 shows a change in image quality in the coding system of the embodiment. As shown in FIG. 7, the image quality deterioration caused by the transform can be restrained even if the data is transformed from Long-GOP into the All-Intra-frame coding. Advantageously, compared with the conventional technique, the good image quality can be maintained during both the recording and editing only by the Long-GOP data and auxiliary less data (prediction parameter and error data).

Thus, in the embodiment, the difference between the data in which the intra-frame coding is performed to the reproduction image of the inter-frame coding data and the data in which the intra-frame coding is performed to the original image is retained, in addition to the coding data in which both the intra-frame coding and the inter-frame coding are used, and the intra-frame coding is performed during the editing using the differential data. Therefore, the editing can be performed using a material having the image quality equivalent to the image in which the intra-frame coding is performed to the original moving image. The error allowable range of the differential data can be adjusted such that the total of the differential data amount and the compression coding data amount does not exceed the data amount in the case where the intra-frame coding is performed to the original moving image.

Accordingly, in the embodiment, the data to which the inter-frame coding is performed can be transformed into the intra-frame coding data while the image quality is maintained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coding apparatus which codes moving images having a plurality of frames by switching between intra-frame coding and inter-frame coding, the apparatus comprising: a first prediction unit which performs intra-prediction of an original image corresponding to an inter-frame coded frame to produce a first prediction residual and a prediction parameter; a second prediction unit which performs intra-prediction of decode data of the inter-frame coded frame with the prediction parameter to produce a second prediction residual; a subtractor which calculates difference data between the first prediction residual and the second prediction residual; a third prediction unit which performs intra-prediction of data corresponding to a decoded frame with the prediction parameter to produce a third prediction residual when the inter-frame coded frame is decoded and transformed into the intra-frame coded frame; an adder which calculates addition data of the third prediction residual and the difference data; and an intra-frame coding unit which performs intra-frame coding of the addition data.

2. The apparatus according to claim 1, further comprising an adjustment unit which adjusts a data size of the difference data.

3. A coding method of coding moving images having a plurality of frames by switching between intra-frame coding and inter-frame coding, the method comprising: performing intra-prediction of an original image corresponding to an inter-frame coded frame to produce a first prediction residual and a prediction parameter; performing intra-prediction of decode data of the inter-frame coded frame with the prediction parameter to produce a second prediction residual; computing difference data between the first prediction residual and the second prediction residual; performing intra-prediction of data corresponding to data corresponding to a decoded frame with the prediction parameter to produce a third prediction residual when the inter-frame coded frame is decoded and transformed into the intra-frame coded frame; computing addition data of the third prediction residual and the difference data; and performing intra-frame coding of the addition data.

4. The method according to claim 3, further comprising adjusting a data size of the difference data.

5. A coding system comprising: a coding apparatus which codes moving images having a plurality of frames to produce first coding data by switching between intra-frame coding and inter-frame coding; and a transform apparatus which performs intra-frame coding to the plurality of frames of the first coding data to transform the first coding data into second coding data, wherein the coding apparatus includes:

a first prediction unit which performs intra-prediction of an original image corresponding to an inter-frame coded frame in the first coding data to obtain a first prediction residual and a prediction parameter; a second prediction unit which performs intra-prediction of a decode image of the inter-frame coded frame in the first coding data with the prediction parameter to produce a second prediction residual; a subtractor which calculates a difference between the first prediction residual and the second prediction residual in each frame as error data; and an output unit which outputs the first coding data, the prediction parameter and the difference data, and the transform apparatus includes: an input unit into which the first coding data, the prediction parameter and the difference data output from the coding apparatus are input; a decoding unit which decodes the inter-frame coded frame in the first coding data to produce a decoded frame; a third prediction unit which performs intra-prediction to the decoded frame with the prediction parameter to produce a third prediction residual; an adder which calculates addition data by adding the third prediction residual to the difference data in each frame; and a coding unit which performs intra-frame coding of the addition data to produce second coding data.

6. The coding system according to claim 5, wherein the coding apparatus further includes an adjustment unit which adjusts a data size of the difference data.

* * * * *